Oct. 4, 1960 E. D. OSTROFF 2,955,211

BISTABLE CIRCUIT

Filed July 19, 1956

STAGE 1 STAGE 2

INVENTOR
EDWARD D. OSTROFF

BY Joseph Weingarten
ATTORNEY

United States Patent Office 2,955,211

Patented Oct. 4, 1960

2,955,211

BISTABLE CIRCUIT

Edward D. Ostroff, South Sudbury, Mass., assignor to Laboratory for Electronics, Inc., Boston, Mass., a corporation of Delaware Filed July 19, 1956, Ser. No. 598,945

3 Claims. (Cl. 307—88)

Figure 1:
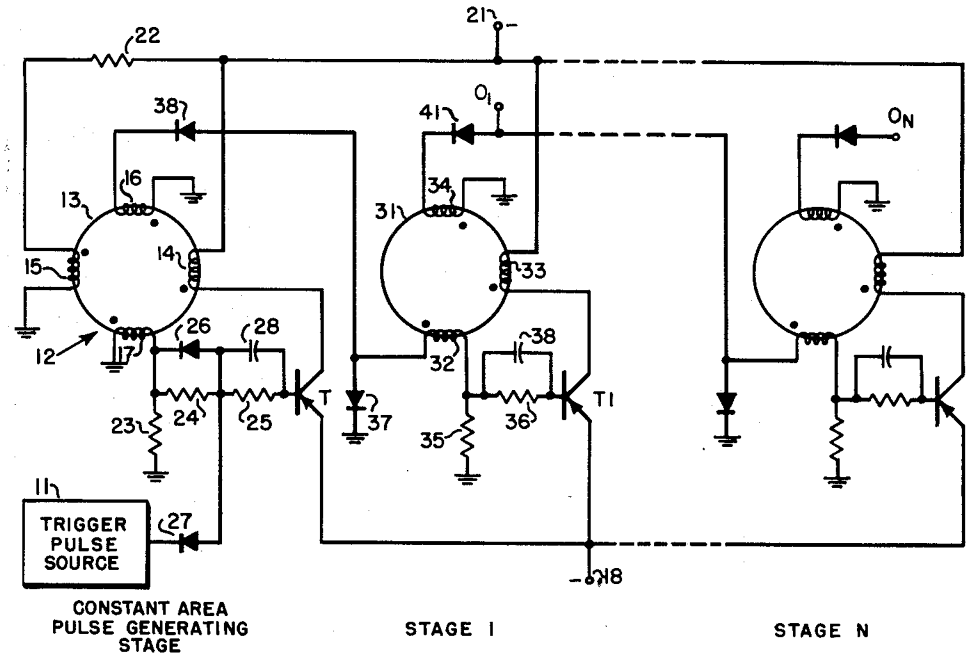

The present invention relates in general to magnetic core-transistor bistable circuits, and represents an extension of the novel principles disclosed in the co-pending application of Edward D. Ostroff and Maurice A. Meyer, Serial No. 574,045, filed March 26, 1956, entitled Transistor Counter.

It is a primary object of the present invention to provide a compact and lightweight bistable circuit having low power requirements while being operative at relatively high speeds. As a feature of this invention, output pulses are of substantially constant area, thus enhancing its utility in a multistage counter formed by cascading the individual bistable circuits.

Another object of the invention is to provide a bistable circuit which utilizes a magnetic core and a single resistively gated transistor.

Still a further object of the invention is to provide a bistable circuit combining a magnetic core and a resistively gated transistor, wherein reliable performance is substantially independent of transistor characteristics.

Another object of the invention is to provide a transistorized pulse generating circuit which responds to each input trigger pulse with an output pulse, the integral with respect to time of each output pulse being a constant substantially independent of the transistor characteristics.

Another object of the invention is to provide current limiting means for precluding application of a potential between elements of the transistor of a value that would induce excessive current flow, and resultant damage to the transistor.

Another object of the invention is to provide a bistable circuit utilizing a magnetic core and transistor, the latter being chosen so that its internal characteristics eliminate the need for external storage elements as a means for delaying output pulses from the circuit. This feature is of particular advantage when it is desirable to have output pulses delayed from the corresponding input pulses, as for example, in a binary rate multiplier of the type used in the so called operational-digital computer, and disclosed in the application of B. M. Gordon and M. A. Meyer, entitled "Computation Circuit," Serial No. 324,312, filed December 5, 1952.

A further object is to provide a magnetic core-transistor circuit for generating constant area pulses in response to trigger pulses from a low impedance source.

Broadly speaking, the present circuit comprises a bistable magnetic core and an associated single switching transistor. This transistor may be activated only when the core resides in the first of its two possible states, and when so activated serves to restore the core to its second stable state. When operating in the binary mode, alternate input pulses to the circuit are effective in changing the core from the second stable state to the first stable state. The remaining pulses activate the switching transistor, thereby returning the core to its second stable state. The transistor dissipates power only when activated. The input pulses are applied to an attenuating network, which includes a set winding on the core serially connected to a base resistance, the latter resistance being small compared to the impedance presented by the set winding when the core is changing stable states. The junction of the winding and the resistance is coupled to the transistor by a current limiting impedance.

In a more specific form the invention comprises a magnetic core which may reside in first and second stable states and having set and reset windings appropriately coupled to a normally non-conductive transistor. An input pulse of a polarity which renders the transistor conductive is applied to the serial combination of the set winding and a base resistance, the latter resistance being small compared to the impedance presented by the set winding when the core is being switched, and large compared to the latter impedance when the core is not switched. Pulses derived across the base resistance are coupled to the transistor through a current limiting impedance, the impedance relations between the set winding input impedance and base resistance being such that only pulses applied to the serial combination when the reset winding impedance is relatively low are effective in rendering the transistor conductive. When the transistor conducts, its collector current flows through the reset winding to switch the core back to the second stable state. During the latter switching interval, the potential derived across the set winding is of a polarity which maintains the transistor conductive until the switching to the second stable state is complete.

The current limiting impedance in one embodiment is preferably a resistance. In another form the current limiting impedance comprises a capacitively shunted resistor, resulting in lower power consumption by the transistor and a further extension of the upper frequency limit of input signals to which the novel bistable circuit is responsive.

The substantially constant area pulse generator, which preferably energizes a counter comprising a plurality of the novel circuits in cascade, comprises a magnetic core having first and second stable states with set, reset and feedback windings appropriately coupled to a normally non-conductive transistor. Gating means couple a source of trigger pulses to the transistor, each trigger pulse rendering the transistor conductive. The gating means serves to decouple the trigger pulse source from the transistor after the latter becomes conductive. The circuit is arranged whereby the transistor collector current flows through the set winding to switch the core to the second stable state. In response to the latter switching, a voltage is derived across the feedback winding and coupled to the transistor to maintain the latter conductive until switching to the second stable state is complete. Means are provided for energizing the reset winding with a current which effects the switching of the core to the first stable state after the switching to the second stable state is complete.

Figure 2:
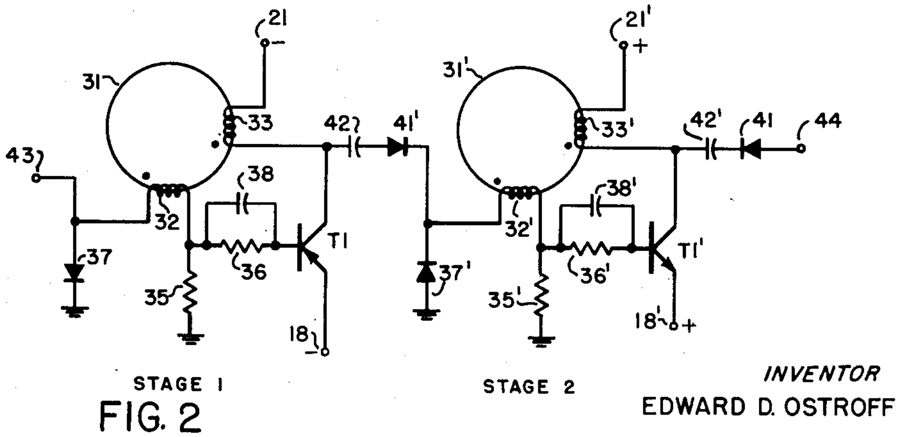

Other features, objects and advantages of the invention will become apparent from the following specification when read with reference to the accompanying drawing in which:

Fig. 1 illustrates a schematic circuit diagram of a counter which comprises a plurality of bistable stages, with the first stage being energized by a constant area pulse generator; and Fig. 2 is a schematic circuit diagram of an embodiment employing transistors having complementary characteristics in adjacent stages to eliminate one winding from each core.

With reference now to Fig. 1 of the drawing, a trigger pulse from pulse source 11 energizes the constant area pulse generating stage 12 to provide at the input of stage 1 a pulse having the desired constant area for each input trigger pulse. For every two input pulses to stage 1 in the preferred arrangement with each stage operating in the binary mode, there is an output pulse on terminal $O_1$. In general, for every $2^n$ input pulses to stage 1 there is one output pulse at terminal $O_N$. Before explaining the mode of operation, the physical arrangement of stage 1, a typical bistable circuit stage, and constant area pulse generating stage 12 will be described.

Stage 12 is seen to comprise a magnetic core 13 with set, reset, output and feedback windings respectively 14, 15, 16 and 17. The emitter of transistor T is connected to terminal 18 which is maintained at a negative potential while its collector is connected to a greater negative potential on terminal 21 through set winding 14. Reset winding 15 is connected between ground and the terminal 21 through resistor 22. Transistor T is maintained normally non-conductive by coupling ground potential to its base through resistors 23, 24 and 25, respectively shunted by winding 17, diode 26 and capacitor 28. Trigger pulse source 11 is coupled to the junction of resistors 24 and 25 by buffer diode 27.

Stage 1 comprises a magnetic core 31 with set, reset and output windings, respectively 32, 33 and 34. The emitter of transistor T1 is connected to terminal 18, and its collector to terminal 21 through reset winding 33. Its base is connected to ground by resistor 35 and current limiting resistor 36 shunted by capacitor 38. One end of set winding 32 is connected to the junction of resistors 35 and 36; the other end, to ground by diode 37, and to output winding 16 of the constant area pulse generating stage 12 by diode 38. Output winding 34 is coupled to the first stage output terminal $O_1$ and to the set winding of the following stage by diode 41.

Having thus set forth the physical arrangement of the circuit, the mode of operation will be described. A negative trigger pulse from source 11 is applied to the base of transistor T through diode 27 and current limiting resistor 25, thereby inducing conductive in transistor T. Diode 26 and the high impedance of resistor 24 relative to resistor 25 prevents application of the negative trigger pulse to winding 17. This prevents the magnetic state of core 11 from being affected by variations in trigger pulse width or amplitude. The flow of collector current through winding 14 initiates the switching of core 13 from the second stable state to the first stable state. The switching of the core induces a negative voltage across winding 17 which is coupled through diode 26 and current limiting resistor 25 shunted by capacitor 28 to transistor T to maintain the latter conductive until the completion of the switching of the core from the first stable state, corresponding to a residual flux density in one saturation region, to the second stable state, corresponding to a residual flux density in the opposite region. Diode 27 prevents application to trigger pulse source 11 of the negative voltage induced across winding 17; hence, the latter pulse source may be of low impedance without introducing loading effects across the transistor input circuits which would reduce the regenerative effect that maintains transistor T conductive until switching of the core is complete. When the switching is complete, the current flowing through resistor 22 and reset winding 15 resets core 12 to the first stable state, thus readying the circuit for generation of another substantially constant area pulse in response to the next input trigger pulse, despite wide variations in trigger pulse amplitude and width. The constant area pulse is applied through diode 38 to stage 1.

The method by which the novel circuit just described and the bistable circuit discussed below generate constant area pulses will be better understood from the following analysis. It is well known that the induced voltage $e$ across a winding may be expressed as:

$$e=-n\frac{d\phi}{dt}$$

where $n$ is the number of turns on a winding, and $d\phi/dt$ the rate of flux change therethrough. Accordingly, $\int edt=-n\int d\phi$, or in a given interval $$\frac{1}{n}\int edt=\phi_1-\phi_2$$

the change in flux during the specified interval. The left hand side of the latter equation is proportional to the voltage pulse area with respect to time derived across an output winding, and the right hand side depends only upon the initial and final flux states in the magnetic core respectively before and after the core is switched. Since the flux changes from one residual flux density to another in saturation regions of opposite sense, the effect of the novel circuit is to generate constant area pulses dependent only upon the residual flux densities of the respective magnetic cores and independent of the transistor characteristics. By a proper selection of the number of turns on a winding, the core size and material, the magnitude of the pulse area may be selected to be any desired value. Normally, this pulse area is selected to be greater than that just sufficient to switch the core in the following stage when operation in the binary mode is desired. By selecting the ratio of winding 16 turns to winding 32 turns to be such that the pulse area derived across winding 16 is a sub-multiple of the area of a pulse necessary to switch core 31, the circuit may be utilized not only in the binary mode, but also in other modes whereby it responds with an output pulse on terminal $O_1$ in response to a selected number of input pulses.

In describing the binary mode of operation of a typical stage, it is convenient to assume that core 31 resides in the second stable state whereby a negative pulse applied to winding 32 is effective in switching the core to the first stable state. Thus, the initial negative pulse from winding 16, coupled through diode 38, is applied to winding 32 and resistor 35; however, the impedance of winding 32 at this time is relatively high compared to resistor 35 and substantially all the pulse energy is dissipated in switching the core to the first stable state. The next negative input pulse occurs when core 31 already resides in the first stable state and winding 32 then presents an impedance which is relatively low compared to resistor 35. Accordingly, substantially all the pulse energy is applied through current limiting resistor 36 shunted by capacitor 38 to the base of transistor T1, rendering the latter conductive. Resistor 36 serves to prevent damage to the transistor by limiting the applied potential between the base and emitter electrodes to a value commensurate with a resulting base current within the transistor ratings and may function for this purpose without being shunted by capacitor 38.

However, the addition of capacitor 38 permits resistor 36 to assume a higher value without impeding the function of the input signal in rendering the transistor conductive. This arrangement not only results in reduced transistor D.-C. base current, and consequently a reduction in transistor power consumption, but also in further extension of the upper frequency limit of input signals to which the circuit responds. The latter feature is believed to follow from the former because of the reduced number of carriers whose inertia must be overcome to reverse their direction of flow. Capacitor 28 serves an analogous function across resistor 25, stage 12 also being operative without the former.

The collector current of the now conducting transistor flows through reset winding 33 to initiate the switching of the core from the first stable state back to the second stable state. In response to the switching, a negative potential is generated across set winding 32 which is applied to the base through resistor 36 to maintain the transistor conductive until switching to the second stable state is complete. Diode 37 serves to clamp the potential of the dotted end of winding 32 to ground, thereby preventing the induced voltage across winding 32 from affecting the preceding stage.

When the novel circuit is utilized in conjunction with an operational digital computer, it is desirable to have a separate output terminal for each stage in order to sense the state of the respective stages shortly after the generation of each trigger pulse. In such a computer, it is desirable to have the information pulses derived from such output terminals occur shortly after the initiating trigger pulse. By utilizing the collector output capacity and the delayed current response of semi-conductor devices to applied transient voltages due to the inertia of the minority carriers, no additional storage elements need be added to the circuit to provide output pulses with the desired delay. Furthermore, elimination of external storage elements increases the rate at which the novel circuit will reliably respond to input pulses, and results in reduced cost, size and weight compared to prior art apparatus for performing the same function.

While the above described circuit is illustrated with PNP transistors, it is equally operative with NPN transistors, it being understood that the diodes illustrated in Fig. 1 would be oppositely poled, trigger pulse source 11 would activate the circuit with positive trigger pulses, and the potential on terminals 18 and 21 would be of positive polarity.

Another form the invention takes is illustrated in Fig. 2, which discloses a pair of adjacent stages utilizing transistors having complementary characteristics; i.e., the first stage uses a PNP transistor and the second an NPN transistor, thereby eliminating an output winding from the core in each of the stages illustrated in Fig. 1. Corresponding elements in Figs. 1 and 2 bear the same reference numeral. Elements in stage 2 of Fig. 2 which correspond to elements in stage 1 bear the reference numeral primed of the corresponding element in stage 1. It is seen that the only difference in this novel arrangement is that diodes 41′ and 37′ are oppositely poled to diodes 41 and 37, the input pulse to a stage is derived from a reset winding 33 and 33′ and coupled to the following stage through capacitors 42 and 42′, and the potentials on terminals 18′ and 21′ are opposite to that on terminals 18 and 21. The mode of operation is substantially as described above. Stage 1 functions exactly as a stage of Fig. 1; however, instead of deriving a negative pulse from a separate winding 34 to energize the following stage, the positive pulse provided across reset winding 33 is utilized therefor. Transistor $T_1'$ is an NPN transistor normally biased beyond cutoff by the positive potential applied to its emitter from terminal 18′ with the base grounded through resistors 35′ and 36′. Therefore, a positive pulse coupled through winding 32′, when this winding presents a low impedance due to core 31′ being set, renders transistor $T_1'$ conductive. Its collector current, flowing through reset winding 33′, resets core 31′ while a negative pulse is provided across winding 33′. This negative pulse is then coupled by capacitor 42′ and diode 41 to the following stage, arranged like stage 1 with a PNP transistor. Thus, any number of pairs of stages may be cascaded to provide a counter with one transistor, one core, and two windings per stage.

In a representative embodiment, the following constructional details and circuit parameters are employed to provide a counter responsive to an input pulse frequency greater than 150 kc.:

| | |
|---|---|
| Cores **13** and **31**— | 30 wraps of ⅛ mil Mo-Permalloy on a 1/16 x 3/16 core. |
| Windings **14** and **33**— | 150 turns of #40 wire. |
| Windings **15** and **34**— | 100 turns of #40 wire. |
| Windings **17** and **32**— | 80 turns of #40 wire. |
| Diodes **26**, **27**, **37**, **38** and **41**— | Type 1N127 point contact diodes. |
| Transistors T and $T_1$— | General Electric type 2N43. |
| Resistors **23** and **24**— | 4700 ohms. |
| Resistor **24** (resistor **23** omitted)— | 2200 ohms. |
| Resistor **25** (capacitor **28** omitted)— | 330 ohms. |
| Resistors **25** and **36**— | 1000 ohms. |
| Resistor **35**— | 220 ohms. |
| Resistor **36** (capacitor **38** omitted)— | 470 ohms. |
| Capacitors **28** and **38** (when present)— | 1000 micromicrofarads. |
| Terminal **21** potential— | −22.5 volts. |
| Terminal **18** potential— | −4.5 volts. |

Numerous modifications of and departures from these specific embodiments described herein will be suggested to those skilled in the art without involving departures from the inventive concepts disclosed herein. Consequently, the invention is to be construed as limited only by the spirit and scope of the appended claims.

What is claimed is:

1. A circuit comprising, a magnetic core of the type having two stable magnetic states, a transistor, a source of triggering signals, a first winding on said core, an impedance connected in series with said first winding, said serially connected first winding and impedance being energized by signals from said source, means connecting said transistor to said impedance to cause the input signal to said transistor to be derived across said impedance, said impedance having a high value compared to the impedance of said first winding when said core is in one stable state and having a low value compared to the impedance of said first winding when said core is in its other stable state, a second winding on said core, said second winding being connected to said transistor and forming a current conductive path therewith, and said first and second windings being arranged on said core whereby switching of said core caused by current flow in said second winding induces a voltage in said first winding of a polarity tending to maintain current conduction through said transistor.

2. A circuit comprising, a magnetic core of the type having two stable magnetic states, a transistor, a source of triggering signals, a first winding on said core, an impedance connected in series with said first winding, said serially connected first winding and impedance being energized by signals from said source, means connecting said transistor to said impedance to cause the input signal to said transistor to be derived across said impedance, said impedance having a high value compared to the impedance of said first winding when said core is in one stable state and having a low value compared to the impedance of said first winding when said core is in its other stable state, a second winding on said core, said second winding being connected to said transistor and forming a current conductive path therewith, said first and second windings being arranged on said core whereby switching of said core caused by current flow in said second winding induces a voltage in said first winding of a polarity tending to maintain current conduction through said transistor, and a diode connected to said first winding and shunting said source, said diode being arranged to decouple said induced voltage from said source.

3. A circuit comprising, a magnetic core of the type having two stable magnetic states, a transistor, a source of triggering signals, a first winding on said core, a resistor connected in series with said first winding, said serially connected first winding and resistor being energized by triggering signals from said source, current limiting means connected between said transistor and said resistor for deriving the input signals to said transistor from across said resistor, said resistor having an impedance with is high compared to the impedance of said first winding when said core is in one stable state and is low compared to the impedance of said first winding when said core is in its other stable state, a second winding on said core, said second winding being connected to said transistor and forming a current conductive path therewith, said first and second windings being arranged on said core whereby switching of said core caused by current flow in said second winding induces a voltage in said first winding of a polarity tending to maintain current conduction through said transistor, and a diode connected to said first winding, said diode being arranged to decouple said induced voltage from said source.

References Cited in the file of this patent

UNITED STATES PATENTS

| | | |
|---|---|---|
| 2,556,286 | Meacham | June 12, 1951 |
| 2,747,110 | Jones | May 22, 1956 |
| 2,760,088 | Pittman et al. | Aug. 21, 1956 |
| 2,777,370 | Bruce | Nov. 27, 1956 |
| 2,851,604 | Clapper | Sept. 9, 1958 |
| 2,854,590 | Wolfe | Sept. 30, 1958 |